United States Patent [19]

Frankel

[11] 4,257,494

[45] Mar. 24, 1981

[54] SAFETY BRAKE FOR ELEVATORS AND AERIAL CABLEWAYS

[75] Inventor: Manfred Frankel, Hof, Fed. Rep. of Germany

[73] Assignee: Söll Kommanditgesellschaft, Industrieschmiede, Hof, Fed. Rep. of Germany

[21] Appl. No.: 31,501

[22] Filed: Apr. 19, 1979

[30] Foreign Application Priority Data

Apr. 27, 1978 [DE] Fed. Rep. of Germany ....... 2818600

[51] Int. Cl.³ .............................................. B66B 5/16
[52] U.S. Cl. ...................................... 187/89; 188/187
[58] Field of Search .................. 187/73, 77, 89, 90, 187/17; 188/71.2, 72.7, 72.8, 187, 184

[56] References Cited

U.S. PATENT DOCUMENTS

| 3,327,811 | 6/1967 | Mastroberte | 187/89 |
| 3,415,343 | 12/1968 | Svensson | 188/187 |
| 3,991,859 | 11/1976 | Coulter et al. | 188/72.7 |
| 4,095,681 | 6/1978 | David | 188/72.8 |

Primary Examiner—David A. Scherbel
Assistant Examiner—Kenneth Noland
Attorney, Agent, or Firm—Watson, Leavenworth, Kelton & Taggart; Watson, Leavenworth, Kelton & Taggart

[57] ABSTRACT

A safety brake is provided for elevators, aerial cableways and the like which prevents unchecked downward travel of the cable car or the elevator cabin in case the lifting or drive cable breaks, or the transmission gear mechanism or the drive motor fails.

9 Claims, 6 Drawing Figures

SAFETY BRAKE FOR ELEVATORS AND AERIAL CABLEWAYS

BACKGROUND OF THE INVENTION

German Patent Application (OS) No. 1,506,473 describes a safety brake which decelerates an elevator when a predetermined speed of rotation of the transmission shaft is exceeded and which is driven via a gear wheel meshing with a rack as guide means. The safety brake comprises a speed limiter in the form of a centrifugal governor with centrifugal weights mounted on the transmission shaft to be decelerated, a brake structure in the form of a bell which surrounds the speed limiter and which is engaged by the centrifugal weights of the speed limiter when a predetermined speed of rotation is exceeded and which is mounted for rotation in a housing, a means for axial displacement of the brake bell, and a means for decelerating the transmission shaft when the brake bell is axially shifted. In such prior art safety brake the centrifugal weights snugly engage the inside of the brake bell to thereby rotate it. The means for axial displacement of the brake bell consists of a spindle with a spindle sleeve secured against rotation which urges the brake bell against a stationary brake member thereby to decelerate it when it is caused to rotate by actuation of the centrifugal brake. Since the braking force is transmitted via the centrifugal weights to the transmission shaft, the operational safety of the safety brake depends on the snug engagement of the centrifugal weights. The edges of the centrifugal weights responsible for the form-locking engagement may partially break away during engagement so that snug fit becomes difficult. Moreover, during the braking operation the braking force constantly increases. For a short stopping distance the braking force therefore must be very high at the end of the braking operation, which puts the elevator guidance and all supporting parts under heavy stress.

SUMMARY OF THE INVENTION

The object of the present invention resides in the provision of a safety brake which reliably responds within a vary narrow speed range of the transmission shaft and whose entire braking operation takes place at substantially constant braking force or deceleration.

This object is realized in that the centrifugal weights are in force-locking engagement with the inside of a brake bell and the transmission shaft is directly decelerated by a brake disc mounted thereon, the bottom of the brake bell serving as a stationary brake member, after the brake bell has come to a standstill which previously was caused to rotate by the centrifugal brake and axially shifted.

Preferably a means is provided by which the brake bell is secured against rotation as long as the torque generated by the centrifugal brake does not exceed a predetermined level. Preferably a means is provided to limit the amount of rotation of the brake bell and thus the braking force.

DESCRIPTION OF THE DRAWINGS

Examples of the invention will be described in more detail with reference to the drawings wherein.

DESCRIPTION OF THE PREFERRED EMBODIMENTS

Figure 1:
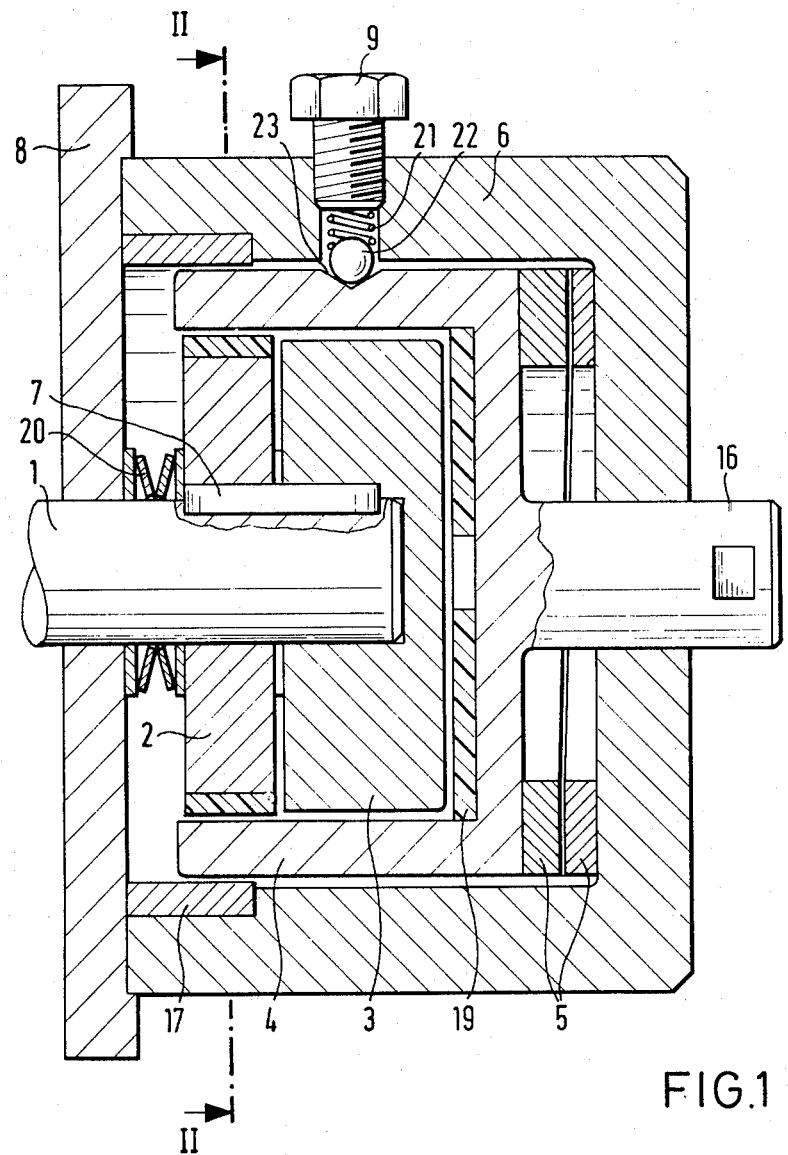
FIG. 1 is a safety brake in longitudinal section.

The safety brake is connected via the transmission shaft 1 to a worm or spur gear mechanism which converts the normal speed of travel of the elevator of 0.2 m/sec., for example, to 1400 rpm of the transmission shaft, for instance. Said worm or spur gear mechanism is independent of the drive unit of the elevator or the cableway. The transmission shaft 1 is driven, for example, via the worm or spur gear mechanism, by a gear engaging a perforated rail mounted to the elevator guide means.

The safety brake comprises a speed limiter 2 and a brake disc 3 both of which are mounted on the transmission shaft 1, the brake disc 3 being fixedly mounted on the transmission shaft 1, while the speed limiter 2 is axially slidable thereon, of a brake bell 4 surrounding the speed limiter 2 and the brake disc 3, two conical spiral discs 5 and a housing 6 which surrounds the entire safety brake. One of the conical spiral discs is mounted at the outside of the brake bell 4, the other one at the bottom of the housing 6.

Figure 2:
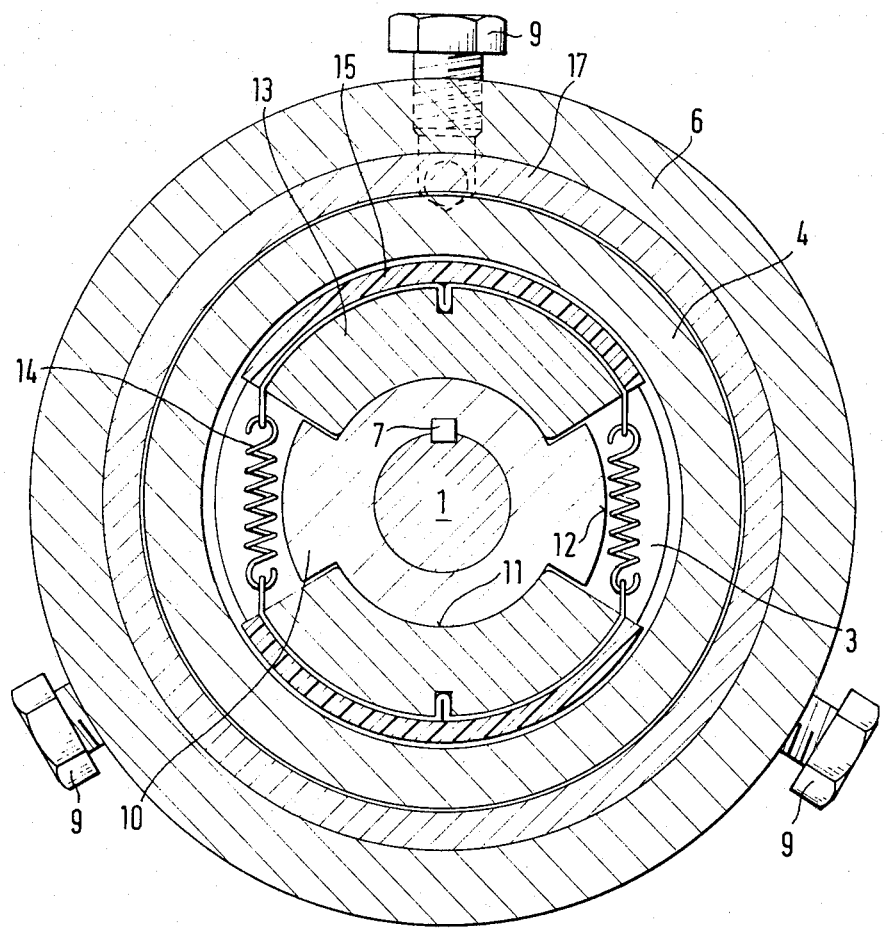
FIG. 2 shows a section along line 2—2 in FIG. 1.

The speed limiter 2 is shown in detail in FIG. 2. The speed limiter has a profile hub 10 seated on the transmission shaft 1 and is caused to rotate by the transmission shaft through a follower key 7, but the hub 10 being slidable on shaft 1. Cup springs 20 urge the speed limiter 2 away from the cap 8 of the worm or spur gear mechanism. The profile hub 10, when viewed in cross section, comprises two oppositely disposed regions 11 of reduced radius and two oppositely disposed regions 12 of increased diameter. The transition from a region 11 of reduced diameter to a region 12 of increased diameter each forms one radially extending step. The speed limiter 2 further comprises centrifugal weights 13 which are held by tension springs 14 and bear against the regions 11 of reduced diameter. In FIG. 2 two tension springs 14 are shown which are fastened to the two centrifugal weights. The centrifugal weights have the cross section of ring segments and the outer surface of each centrifugal weight 13 is provided with a brake lining 15.

The speed limiter 2 acts as a centrifugal brake. The profile hub 10 and the centrifugal weights 13 urged against the profile hub are caused to rotate by the transmission shaft 1. The tensile force of the springs is dimensioned such that at normal speed of travel it exceeds the centrifugal force exerted by the centrifugal weights 13. At normal speed of travel the centrifugal weights 13 bear against the regions 11 of reduced diameter of the profile hub. When the normal speed of travel is exceeded the centrifugal force exerted by the centrifugal weights 13 becomes greater than the tensile force of the tension springs 14 and the centrifugal weights 13 move away from the profile hub 10. The brake linings 15 of the centrifugal weights 13 thereby come to lie against the inner periphery of the brake bell 4 causing it to rotate.

Furthermore, on the transmission shaft 1 a brake disc 3 is mounted. The mounting if effected suitably also by the follower key 7. In contrast to the speed limiter 2 the brake disc 3 is not axially slidable. The brake disc 3 is mounted at the end of the transmission shaft 1 and is of cylindrical shape. The diameter of the brake disc 3 corresponds to the diameter of the speed limiter 2 determined by the brake linings 15, or is somewhat less than that.

The speed limiter 2 and the brake disc 3 are surrounded with small clearance by a brake bell 4. The brake bell 4 has the shape of a hollow cylinder open at one end. From the closed end of the cylinder an extension or stub shaft 16 extends outwardly. When the brake bell 4 is shifted over the brake disc 3 onto the speed limiter 2, the extension 16 is in axial alignment with the transmission shaft 1.

The brake bell 4 is surrounded, in turn, by a housing 6 which also has the shape of a hollow cylinder open at one end. The housing 6 of the safety brake is fixedly mounted to the elevator cabin or the cable car, for example via the cap 8 of the worm or spur gear mechanism. The brake bell 4 is mounted for rotation within the housing. The mounting is effected at the open end of the brake bell 4 by a sliding ring 17 provided at the inner periphery of the housing 6 and at the closed end of the brake bell 4 by the extension 16 which extends through a central opening at the closed end of the housing 6 and is supported for rotation in said opening. The end of the extension 16 extending from the housing is suitably designed for lever engagement in that it has a tetrahedral or hexahedral periphery or is provided with radial bores.

Figure 3:
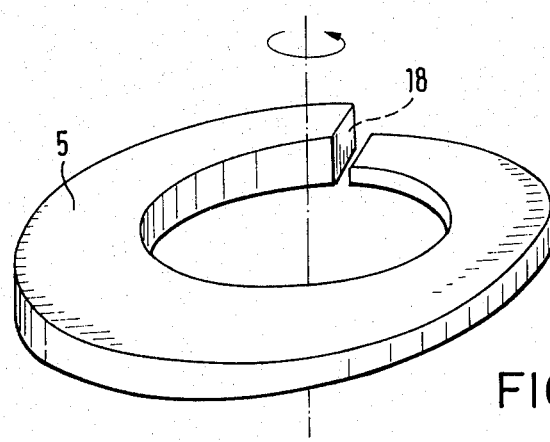
FIG. 3 is a perspective view of one of the conical spiral discs serving to axially shift the brake bell.

Between the brake bell 4 and the housing 6 there are two conical spiral discs 5 one of which is mounted outside at the surface forming the closed end of the brake bell 4, while the other one is mounted inside at the bottom of the housing 6. The outer diameter of the conical spiral discs suitably corresponds to the outer diameter of the brake bell 4. FIG. 3 shows an example for a conical spiral disc which is useful for the present invention. The thickness of the conical spiral discs uniformly increases along its periphery. Between the points of minimum and maximum thickness a step 18 is formed. The conical spiral discs are mounted at the brake bell 4 and at the housing 6, respectively, with their flat sides, i.e. the sides forming no step. The conical spiral discs may be understood as a flat wedge whose two ends have been bent toward each other to thereby form a flat circular disc. The conical spiral discs may be designed as a closed ring or as a ring having a narrow gap between the points of minimum and maximum thickness. Both conical spiral discs are mutually complementary, i.e. the thickness increase of the one spiral disc corresponds to an equal thickness reduction in the other spiral disc. The direction in which the thickness of the spiral disc mounted at the brake bell 4 decreases, corresponds to the direction of rotation of the transmission shaft 1 during downward travel of the cable car or the elevator cabin. In normal operation the conical spiral discs are lying one against the other with the front faces of the step 18 abutting with each other. When the brake drum is rotated in the direction in which the transmission shaft 1 rotates during downward travel of the elevator cabin (in FIG. 3 this direction is indicated by an arrow under the assumption that the conical spiral disc shown in FIG. 3 is mounted at the brake bell 4), the brake drum 4 in FIG. 1 is urged toward the left hand side, i.e. away from the bottom of the housing 6 and towards the brake disc 3. The planar inner side of the brake bell 4 is provided with a brake lining 19 and the axial spacing between the brake lining 19 and the brake disc 3 is less than the height of the step 18 and preferably less than half the height of step 18. For safety reasons it is preferred that said axial distance corresponds to one fourth of the height of step 18. The height of the step 18 is understood to be the difference between the maximum and the minimum thickness of a conical spiral disc 5. As a consequence, the brake bell 4 can rotate by not more than one full rotation (in preferred embodiments half or a quarter rotation) and the brake bell 4 halted after a complete or a quarter rotation brakes the brake disc 3, and thus the elevator via the transmission shaft 1 and the gear engaging the rack.

Hereafter the mode of operation of the described safety brake will be explained. When a predetermined speed of downward travel is exceeded due to failure of the driving unit or breaking of the lift cable, and if thereby the speed of rotation of the transmission shaft 1 becomes so high that the force active at the centrifugal weights 13 exceeds the force of the tension springs 14, the centrifugal weights 13 will be urged radially outwardly and away from the transmission shaft 1. The centrifugal weights 13 which perform at the same time the function of brake jaws then engage the inner periphery of the brake bell 4 and set it in rotation. Due to the action of the conical spiral disc 5, the rotary motion of the brake bell shifts the latter towards the brake disc 3. The brake bell 4, on account of the engaging brake linings 15 of the centrifugal weights 13, in turn shifts the axially shiftable speed limiter 2 against the force of the cup springs 20. After a relatively minor rotation the brake bell 4 comes to a standstill because the axial space between the brake lining 19 on the inner side of the brake bell and the brake disk 3 becomes too small for further rotation. Owing to their conicity, the spiral discs 5 shift the brake bell 4 not only towards the brake disc 3 but simultaneously urge the brake bell 4 against the brake disc 3. The brake disc 3 is rapidly decelerated by the brake bell 4 which has come to a standstill so that the elevator cabin or the cable car comes to a stop.

As soon as the speed of travel drops below the predetermined speed level, the brake linings 15 disengage from the brake bell 4 and the speed limiter is urged back into its inoperative position by the cup springs 20.

When the cabin or the cable car is to be set in motion again the brake bell must first be unlocked by means of a lever which must engage the end of the extension 16. The rotary motion required for unlocking the brake bell is contrary to the path travelled by the brake bell during braking action. The safety brake may also be unlocked by opposite direction of travel.

Furthermore, means are provided which prevent accidental rotation of the brake bell 4 toward the brake disc 3. This means may consist of a catch resembling a snap lock which may be unlocked by the exertion of a relatively minor force. The catch may consist of an adjusting screw 9 inserted into a threaded bore in the housing 6 and urging, via a helical spring 21, a ball 22 into a flat frusto-conical recess 23 in brake bell 4. Suitably a plurality of such catch means are spaced equidistantly around the periphery of the housing 6.

The brake linings 15 and 19 are commercial plastic brake linings.

The sliding ring 17 should preferably be made of bronze. All the other parts may be made of steel.

Figure 5:
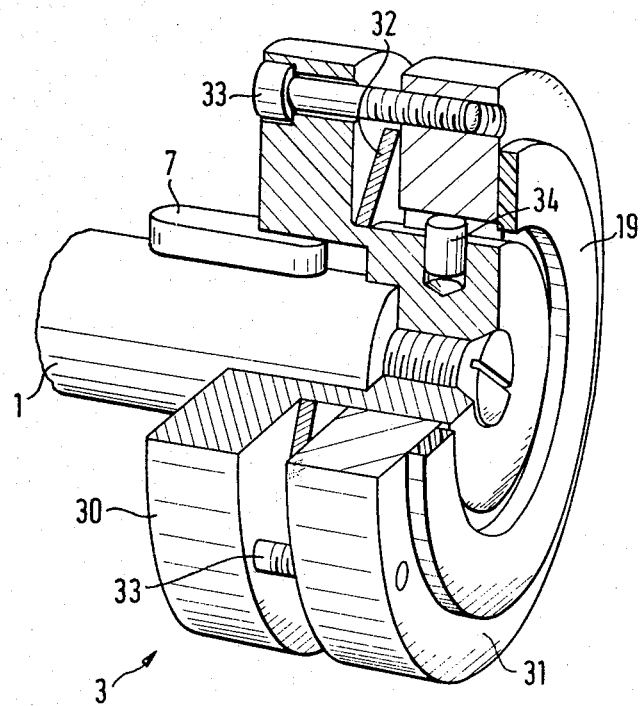
FIG. 5 shows details of the brake disc.
Figure 4:
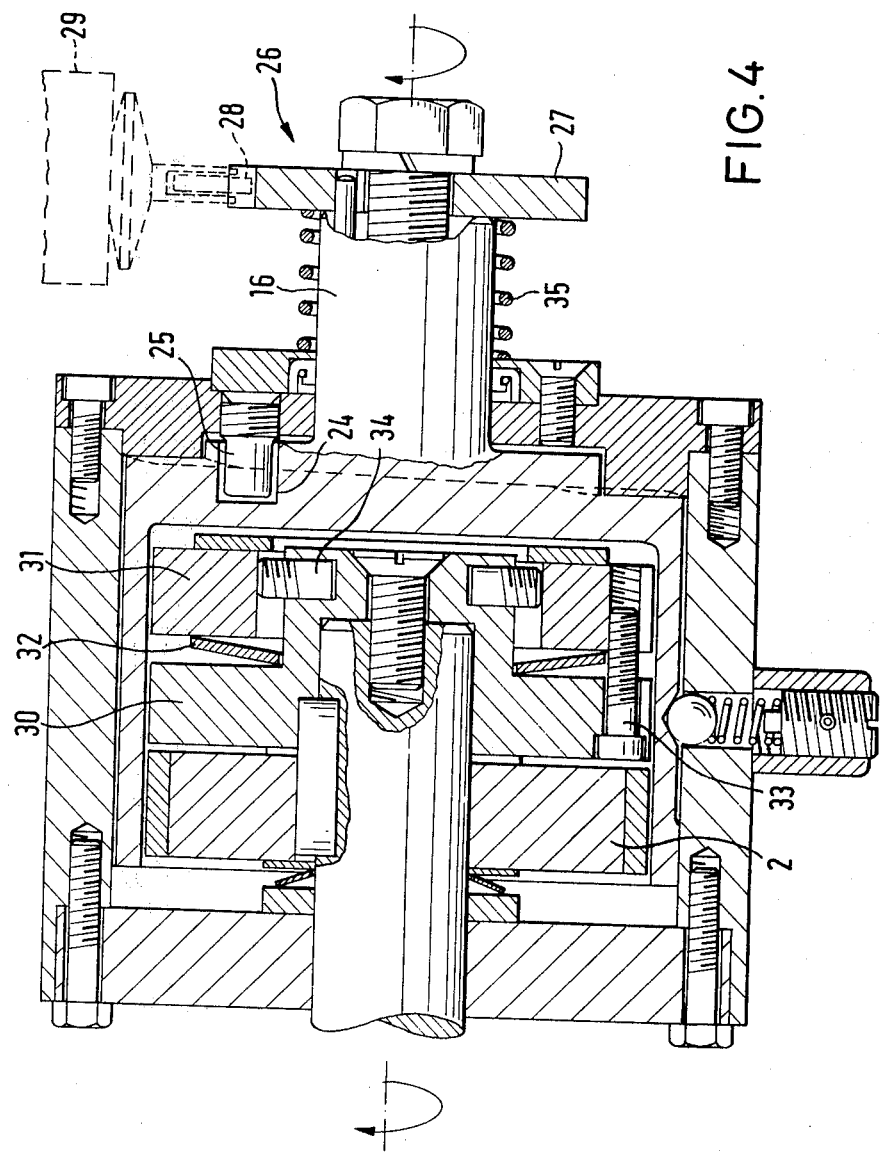
FIG. 4 illustrates an embodiment of the safety brake with safety switch and limitation of the amount of rotation of the brake bell.
Figure 6:
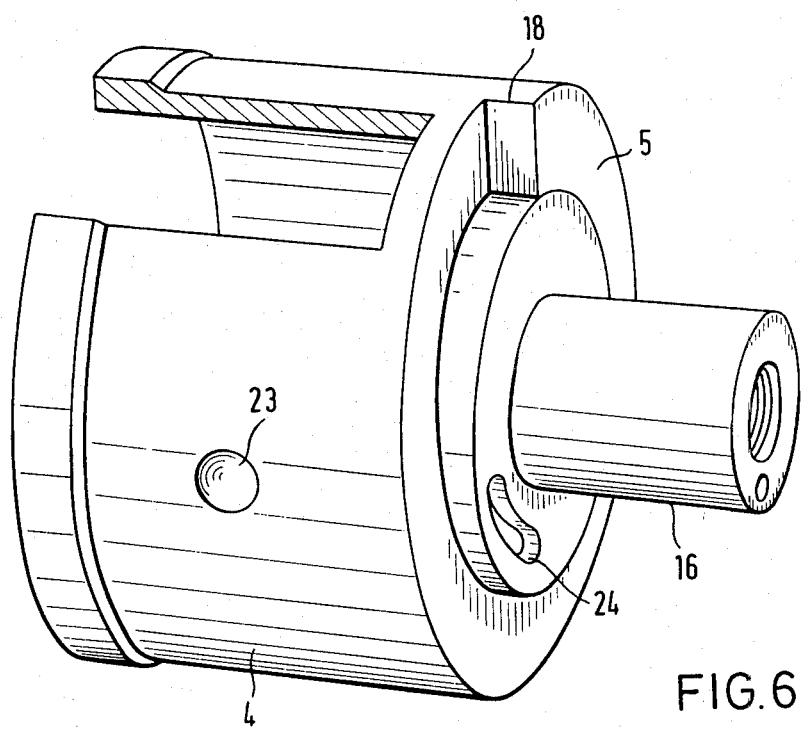
FIG. 6 is a perspective view of a brake bell.

FIGS. 4, 5 and 6 show an embodiment of the safety brake in which the braking force is adjustable by means of a stop screw 25 which engages a slot 24 in the planar outer side of the brake bell 4. FIG. 4 additionally shows a safety switch mechanism 26.

The stop screw 25 is screwed into a threaded bore in the bottom of the housing 6 and extends somewhat into the interior of the housing 6. The stop screw 25 engages a slot 24 provided in the planar outer side of the brake bell 4 in the inner region not covered by the conical spiral disc 5. The slot 24 curves in a circular arc through a predetermined angle. The engagement of stop screw 25 and slot 24 limits the rotary motion of the brake bell 4, thus limiting the maximum axial displacement of the brake bell 4. Since the braking force depends on the amount of axial displacement of the brake bell 4, this simultaneously limits the braking force. The braking force may be varied by a change of the length or of the arc measure of the slot 24.

In the embodiment shown in FIGS. 4 and 6 the conical spiral discs 5 are not separate parts but are made integral with the brake bell 4 and the top of the housing 6, respectively. The slot 24 generally does not extend through the bottom of the brake bell 4.

It is sufficient when the slot 24 is deep enough to ensure safe engagement between stop screw 25 and slot 24.

As shown in FIGS. 4 and 5, in this embodiment the brake disc 3 is assembled from a plurality of parts such that the brake lining 19, which in this embodiment is fastened to the brake disc rather than to the bottom of the brake bell 4, uniformly engages the bottom of the brake bell 4. The brake disc 3 consists of a clutch disc 30 with axial extension on which an annular brake lining 19. The brake lining support 31 is urged away from the clutch disc 30 by a spring, e.g., a cup spring 32. By suitable means, e.g., screws 33, the maximum distance of the brake lining support 31 from the clutch disc 30 is determined. The screws 33 are fastened in the brake lining support 31 and extend through bores in the clutch disc 30 so as to be shiftable in said bores.

The cup spring 32 is biased and produces the force which urges the brake lining support 31 against the brake bell 4 so that the resulting braking moment depends on the biasing and the characteristic of the cup spring 32. In addition, and as mentioned before, the braking moment also depends on the arc measure of the slot 24 or the amount of axial displacement of the brake bell 4 which is equal to the movement of the cup spring 32 plus the distance of the planar inside of the brake bell 4 from the brake disc 3 or the brake lining support 31 in inoperative position.

The cup spring 32 additionally ensures that the safety brake holds the elevator after the braking operation so that the elevator cannot intermittently slide or jolt downward due to minor canting of the brake bell 4 relative to the transmission shaft 1 or due to an eccentricity.

The bolt 34 transmits the rotary motion of the clutch disc 30 to the brake lining support 31. FIG. 4 shows two bolts 34. The number of bolts should be selected such that they are able to transmit to the clutch disc 30, the torque resulting from braking. The bolts 34 are mounted in blind bores around the periphery of the extension of the clutch disc 30 and engage longitudinal grooves on the inside of the brake lining support 31. The clutch disc 30 is screwed to the butt of the transmission shaft 1 and transmits the braking force to the latter by way of a follower key 7.

The embodiment of the brake disc 3 illustrated in FIGS. 4 and 5 ensures smooth response of the safety brake under the action of the adjusted braking force.

The safety switch mechanism 26 may consist of a cam 27 by which a limit switch 29 is actuated by way of a roller tappet 28 such as to interrupt current flow to the elevator or cableway motor. The cam 27 is secured to the extension 16 of the brake bell 4 extending from the housing 6 so that it rotates together with the brake bell 4. The limit switch 29 and the cam 27 are designed such that upon actuation of the safety brake, i.e., upon rotation of the brake bell corresponding to the arc measure of the slot 24, the limit switch 29 interrupts the flow of current to the drive motor.

Otherwise the construction and the function of the embodiment shown in FIGS. 4 to 6 is the same as in the embodiment of FIGS. 1 to 3.

Disengagement of the safety brake may be effected by travel in opposite direction thereby the brake bell 4 wedged against the brake lining is given an angular momentum which returns it to its initial position, said angular momentum being sufficient to completely return the brake bell to its basic position where the ball 22 snaps into the recess 23, after the brake bell 4 has come free from the brake lining 19. The axial shifting of the brake bell 4 away from the brake disc 3 is effected by the momentum produced by the cup spring 32. As soon as the basic position of the safety brake is reached, the flow of current to the drive motor is simultaneously re-established by the safety circuit mechanism 26.

Between the cam 27 and the top of the housing 6 a compression spring 35 may be provided which urges the brake bell away from the brake disc 3, i.e., which slightly urges the two conical spiral discs against each other and stabilizes the brake bell 4 in its inoperative position. As the safety brake is unlocked by travel in the opposite direction the steps 18 in the conical spiral 5 clash against each other at high speed and throw the brake bell 4 out of the position again that it is supposed to reach by the cooperation of the helical compression spring 21, the ball 22, and the recess 23. The compression spring 35 attenuates the impact of steps 18 against each other and thus stabilize the brake bell 4. The impact effect, however, occurs only at high speeds of the transmission shaft 1. If the transmission shaft has a speed of about 500 rpm at normal speed of travel of an elevator, the impact between the steps 18 is so insignificant that a compression spring 35 is not required. However, at higher speeds of 1000 rpm or more, for example, it is advisable to provide the compression spring 35 in order to be able to hold the safety brake in this position even after complete disengagement. Of course, the compression spring 35 must not be so strong that it resists the axial displacement of the brake bell 4 as the safety brake is set in operation, thus counteracting the effect of the cup spring 32.

In the embodiment of FIGS. 4 to 6 only a single slot 24 and a single stop screw 25 are provided. In the planar outer side of the brake bell 4 also a plurality of slots may be provided which may be spaced the same or different distances from the longitudinal axis of the safety brake. For each slot 24 a threaded bore for a stop screw 25 cooperating with the slot is provided in the bottom of the housing 6. If the various slots have various arc measures, i.e., if they have different length, the angle of rotation of the brake bell 4 will vary depending on the threaded bore into which the step screw 25 is screwed. The slots 24 need not be provided in the planar outside of the brake bell 4, they may also be provided on the cylindrical outer face of the brake bell 4.

All the parts of the safety brake are protected against corrosion by suitable methods, preferably by copper plating, subsequent application of a cadmium coating by electroplating, electrodeposition from cyanide-containing cadmium salt solutions, by means of cadmium anodes, or by vacuum vapor coating and finally chromatizing (DIN 50 902). The cadmium coating simultaneously reduces friction within the sliding fit for the bell, between the spiral discs and between the clutch plate and the brake lining support. The safety brake is suited to decelerate transmission shafts operating at very high speeds up to 10,000 revolutions per minute or more, as well as shafts rotating at speeds as low as 3 rpm. Preferably the worm or spur gear mechanism to which the transmission shaft is connected is designed such that the transmission shaft rotates at a speed between 300 and 1500 rpm at normal speed of travel of the elevator cabin or the cable car. At speeds below 300 rpm the trigger speed of the speed limiter cannot be precisely adjusted. At higher speeds, however, the safety brake is capable of responding to the trigger speed with a precision of ±1.25%. The safety brake is not susceptible to shock, and there is no risk that, for example, a strong impact will trigger the safety brake although the triggering speed of the transmission shaft 1 is not reached. The safety brake is quick to respond and the so-called dead time (time interval until the full braking force is reached) is less than 0.1 second.

In case part of the safety brake fails to operate, the speed limiter 2 alone will prevent elevator free fall descent down because the speed of the transmission shaft cannot substantially exceed the triggering speed, i.e., the speed at which the centrifugal weights 13 overcome the force of the tension springs 14 by virtue of the centrifugal force, owing to the speed limiter 2.

What is claimed is:

1. A safety brake for decelerating an elevator cabin, a cable car or the like moving along guide means said safety brake comprising a transmission shaft adapted to be driven by said guide means through transmission means, a speed limiter mounted on the transmission shaft including a centrifugal brake having centrifugal weights carrying brake linings, a brake disc mounted on the end of the transmission shaft, a housing, a brake bell surrounding the speed limiter and the brake disc so that said brake bell will be frictionally engaged and rotated by the brake linings carried on the centrifugal weights of the speed limiter when the triggering speed is exceeded, said bell being supported in said housing for rotation and for axial movement between an inoperative position in which said bell does not engage said brake disc and an operative position in which said bell frictionally engages said brake disc, and means for axially displacing the brake bell from said inoperative position to said operative position upon rotation of said bell through less than one complete rotation and for limiting the rotation of the brake bell to less than one complete rotation.

2. A safety brake for decelerating an elevator cabin, a cable car or the like moving along guide means, said safety brake comprising a transmission shaft adapted to be driven by said guide means through transmission means, a speed limiter mounted on the transmission shaft including a centrifugal brake having centrifugal weights carrying brake linings, a housing, a brake disc mounted on the end of the transmission shaft, a brake bell surrounding the speed limiter and the brake disc and engaged by brake linings carried on the centrifugal weights of the speed limiter when the triggering speed is exceeded, said bell being supported for rotation and for axial movement in said housing, and means for axially displacing the brake bell and for limiting the rotation of the brake bell to less than one complete rotation, said brake bell engaging and decelerating the brake disc upon axial displacement thereof, said means for axial displacement of the brake bell and for limiting the rotation of the brake bell comprising two mutually complementary conical spiral discs one of which is carried at the bottom of the housing, the other spiral disc being carried on a planar outer face of the brake bell, the thickness of the spiral disc carried on the brake bell decreasing uniformly in the direction of rotation of the transmission shaft during downward direction of travel of the elevator, each of said spiral discs having a step between the point of minimum and maximum thickness thereon.

3. Safety brake according to claim 1 in which the means for axial displacement of the brake bell and for limiting the rotation of the brake bell comprises two mutually complementary conical spiral discs one of which is carried at the bottom of the housing, the other spiral disc being carried on a planar outer face of the brake bell, the thickness of the spiral disc carried on the brake bell decreasing uniformly in the direction of rotation of the transmission shaft during downward travel of the elevator, each of said spiral discs having a step between the point of minimum and maximum thickness thereon, there being an axial distance between said brake disc and a planar inner side of the brake bell when said brake bell is in said inoperative position, such axial distance being less than the height of the steps in the conical spiral discs.

4. Safety brake according to one of claim 1, 2 or 3 in which the means for axial displacement of the brake bell and for limiting the brake bell rotation further includes a slot in the outer side of the brake bell and a stop member for engagement with said slot, said stop member being fastened in the housing such that the amount of rotation of the brake bell until engagement of the safety brake is determined by the arc measure of the slot.

5. Safety brake according to claim 1 or claim 3 further comprising catch means for releasably retaining said bell so as to prevent movement of said bell from its inoperative position when said bell is not engaged by said brake linings, said catch means being operative to release said bell upon engagement of said bell by said brake linings and rotation of said transmission shaft.

6. Safety brake according to claim 5, in which said bell has a recess in its outer surface and said catch means includes a ball slidably mounted to said housing and a spring, said spring biasing said ball towards said bell, said ball being received in said recess when said bell is in its inoperative position.

7. Safety brake according to claim 1 or claim 3 further comprising means for operating a switch upon movement of said bell from its inoperative position to its operative position.

8. Safety brake according to claim 1 or claim 3 in which said brake disc includes a clutch disc fixed to said transmission shaft, a support mounted to said clutch disc for rotation therewith, said support being axially displaceable with respect to said clutch disc, said support defining a face transverse to said shaft and facing away from said clutch disc, said brake disc also including a spring, said spring biasing said support away from said clutch disc, said bell in its operative position frictionally engaging said face of support.

9. Safety brake according to claim 8 in which said support includes a brake lining which defines said face.

* * * * *